Aug. 13, 1935.  N. F. MILLER  2,011,229

MOTOR VEHICLE LICENSE PLATE

Filed Oct. 3, 1934  3 Sheets-Sheet 1

Inventor
N. F. Miller
By C. A. Snow & Co.
Attorneys

Aug. 13, 1935.  N. F. MILLER  2,011,229
MOTOR VEHICLE LICENSE PLATE
Filed Oct. 3, 1934  3 Sheets-Sheet 2
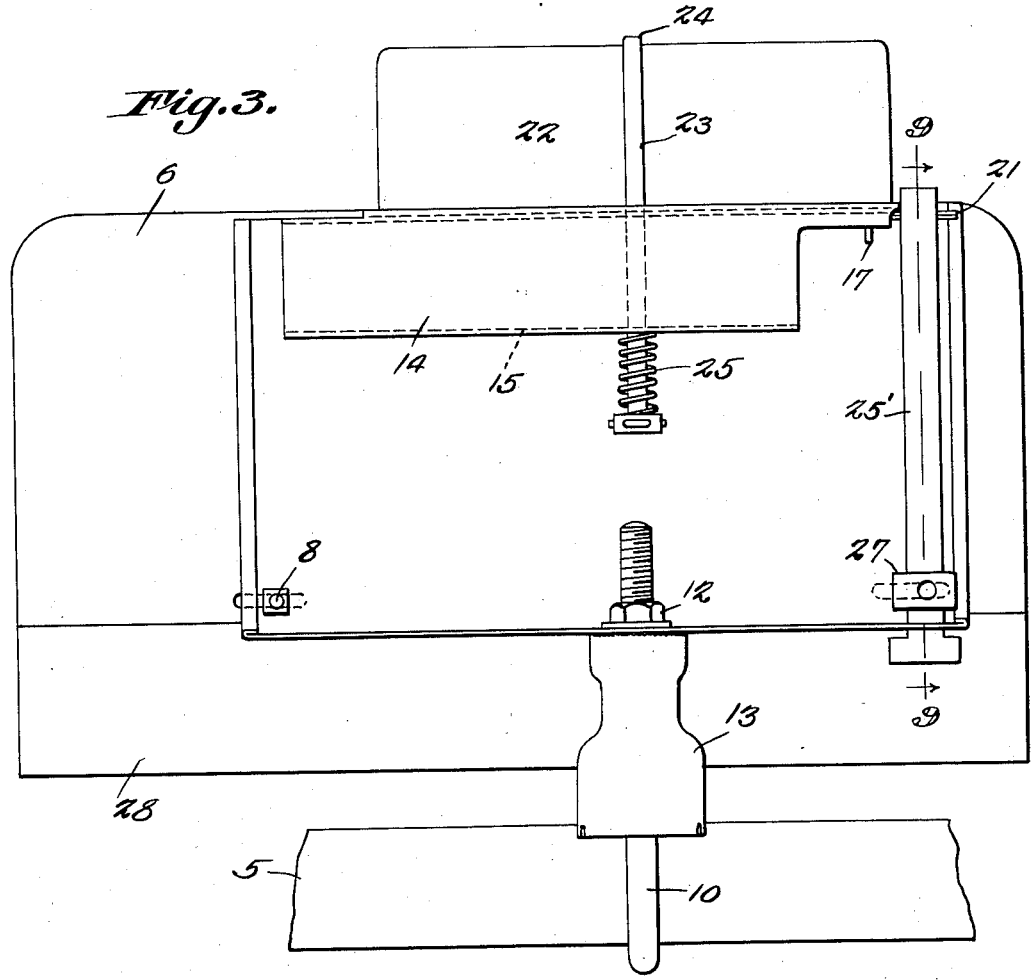
Fig. 3.
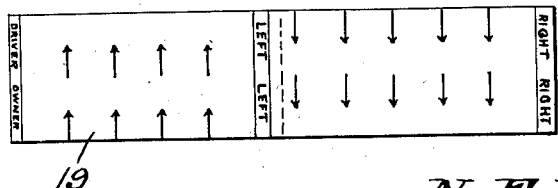
Fig. 4.
Fig. 5.
Inventor
N. F. Miller
By C. A. Snow & Co.
Attorneys Aug. 13, 1935.                N. F. MILLER                2,011,229
                    MOTOR VEHICLE LICENSE PLATE
                       Filed Oct. 3, 1934         3 Sheets-Sheet 3
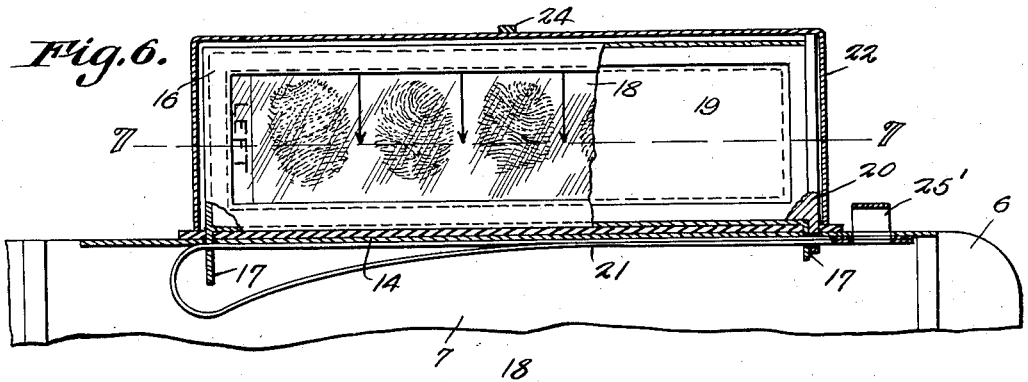
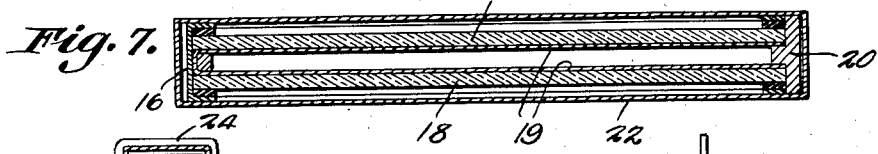
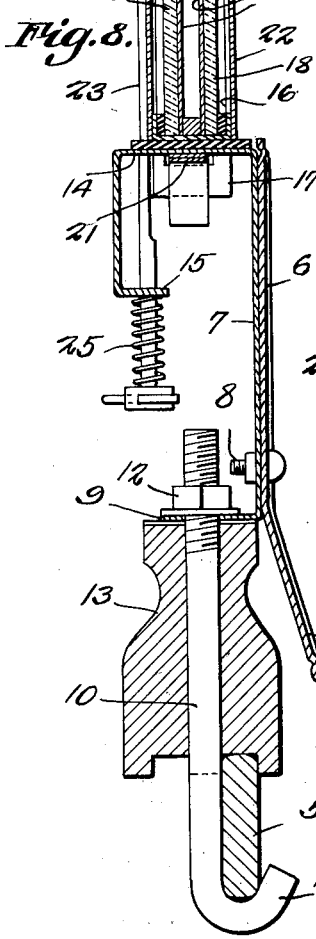
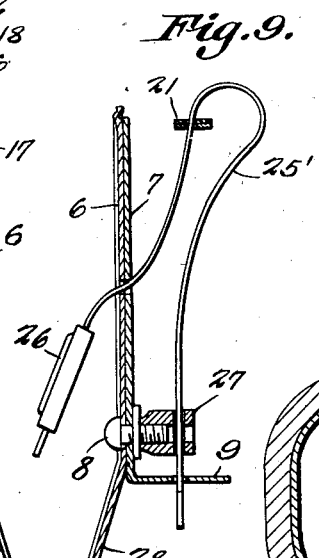
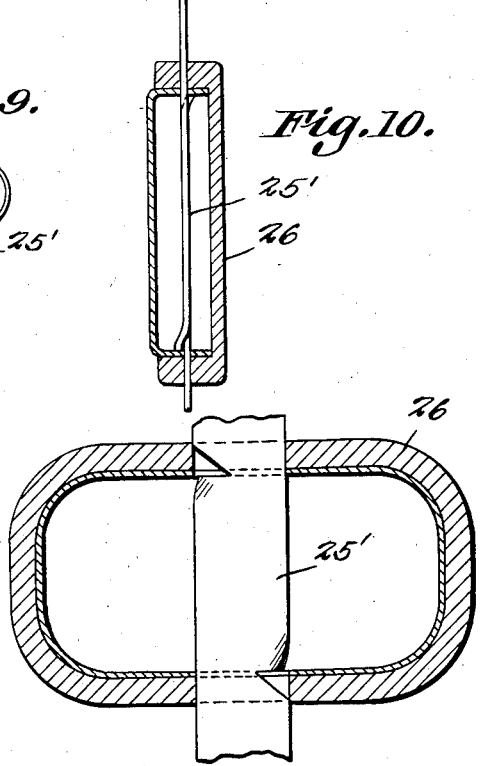
Inventor
N. F. Miller
By C. A. Snow & Co.
Attorneys.

Patented Aug. 13, 1935

2,011,229

UNITED STATES PATENT OFFICE 2,011,229

MOTOR VEHICLE LICENSE PLATE

Nickolaus F. Miller, Dwight, Ill.

Application October 3, 1934, Serial No. 746,718

3 Claims. (Cl. 40—2.2)

This invention relates to a combined motor vehicle license tag and identification means, constructed in such a way that a complete driver's record may be readily ascertained.

Another object of the invention is the provision of means whereby the owner or authorized operator of a motor vehicle may be readily determined, thereby reducing the theft of motor vehicles to a minimum.

A still further object of the invention is to provide means for containing an identification card which may be readily examined by an officer of the law, to positively identify the rightful owner or legal possessor of the motor vehicle.

A still further object of the invention is to provide a motor vehicle license tag secured to the vehicle in such a way that the license plate may only be removed by destroying the securing means.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a rear elevational view of the license plate and its support.

Figure 4 is a view illustrating the identification card carried by the operator of the vehicle, the identification card corresponding to the identification section of the license plate.

Figure 5 is a view illustrating the card bearing the finger prints of the owner or authorized operator of the vehicle.

Figure 6 is a fragmental elevational view disclosing the upper portion of the plate, a portion of the upper compartment being broken away to illustrate the card carrying the finger prints, as positioned therein.

Figure 7 is a sectional view taken on line 7—7 of Figure 6.

Figure 8 is a vertical sectional view through the license plate and its support.

Figure 9 is a sectional view taken on line 9—9 of Figure 3.

Figure 10 is a sectional view through the seal, forming a part of the license plate securing means.

Figure 11 is a transverse sectional view through the seal.

Figure 1:
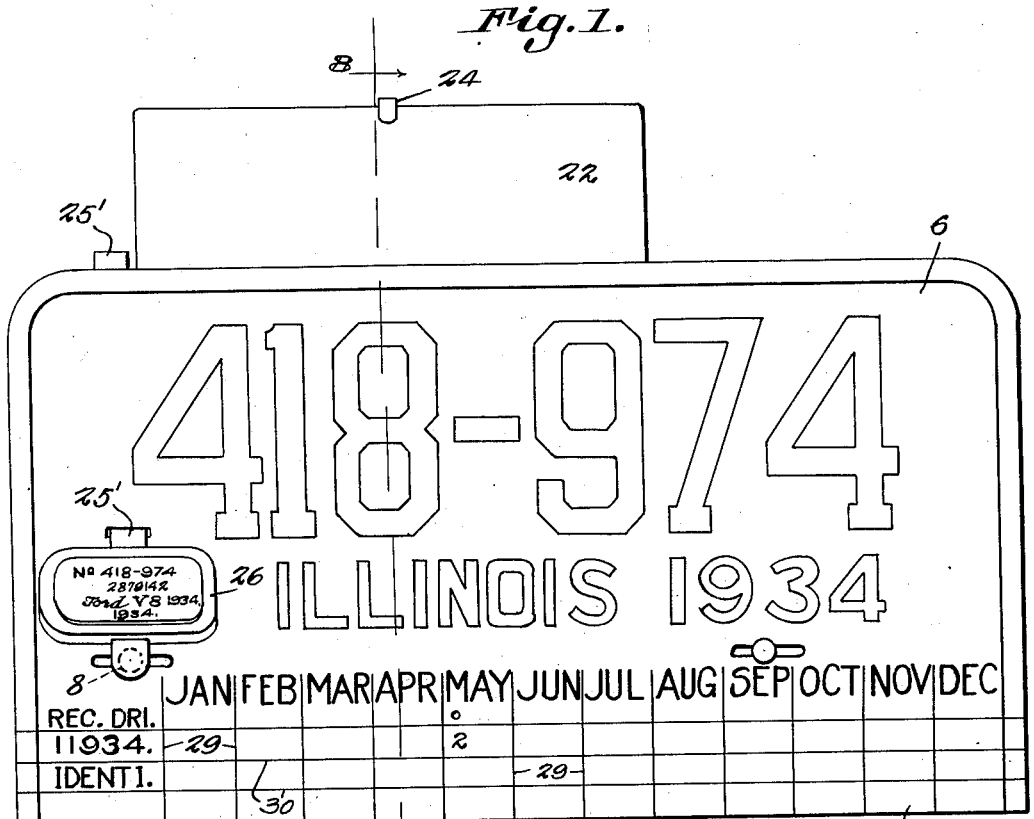
Figure 1 is an elevational view of a license plate constructed in accordance with the invention.
Figure 2:
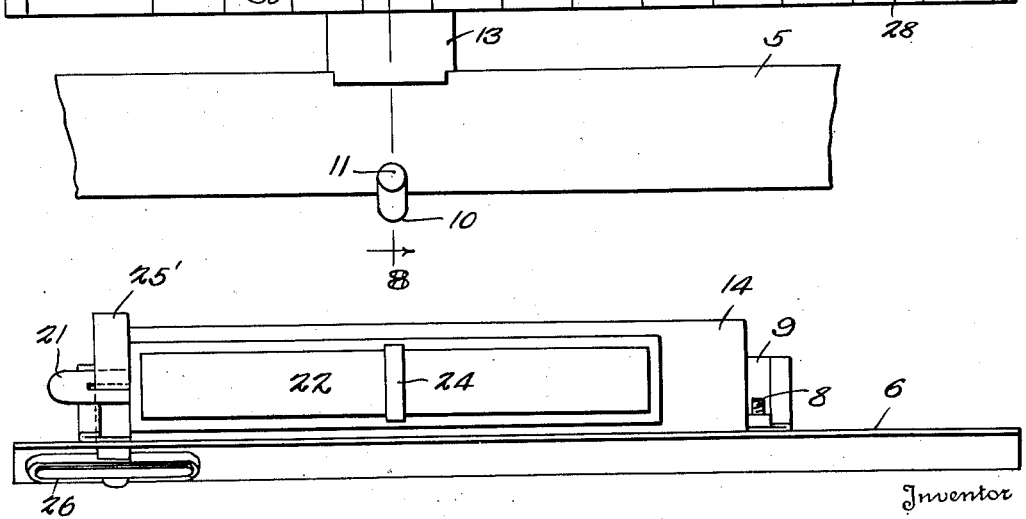
Figure 2 is a plan view thereof.

Referring to the drawings in detail, the reference character 5 designates a bumper or other supporting bracket forming a part of a motor vehicle, to which the license plate, forming the subject matter of this invention, is secured.

The license plate is indicated by the reference character 6 and is secured to the supporting plate 7, by means of bolts 8 that pass through registering openings in the license plate 6 and supporting plate 7.

This supporting plate 7 is formed with a rearwardly extended flange 9 that has an opening accommodating the bolt 10 formed with a hook 11 at its lower end, the upper end of the bolt being threaded to accommodate the nut 12.

The bolt 10 extends through the clamping member 13, and cooperates with the clamping member in securing the license supporting plate in position on its support.

At the upper end of the supporting plate 7, is a flange 14 that extends inwardly and downwardly, the lower edge of the flange being extended inwardly at 15. This flange 14 provides a support for the container 16 that has downwardly extended ears 17 arranged at its ends, which ears pass through openings formed in the flange 14, for purposes to be hereinafter more fully described.

The container 16 has its sides closed by means of the translucent members 18 so that the finger prints on the card 19, positioned within the container, may be readily viewed without the necessity of removing the card from the container.

One end of the container 16 is closed by the closure 20, which closure is held in position by means of the metallic strap 21, making it impossible to remove the card 19, without destroying the strap 21.

Under normal conditions, the container 16 is encased by the member 22 which is positioned over the container, and held in position by means of the clamping arm 23, which is shown as provided with a hook 24 at its upper end, of a construction to be hooked over the container. A coiled spring indicated by the reference character 25, is mounted on the clamping arm 23 and normally urges the clamping arm to its clamping or active position. Thus it will be seen that should it be desired to remove the member 22, it is only necessary to press the clamping arm 23 upwardly disengaging the hook 24 and container, whereupon the hook may be rotated out of the path of travel of the upward movement of the member 22, and the member 22 removed.

The metallic strap 21 is shown as passing through openings of the ears 17, securing the container to the supporting plate. The ends of the metallic strap are formed with elongated openings accommodating the metallic strap 25' that has one of its ends extended through the supporting plate 7 and license plate 6, where it is supplied with a seal 26 which is locked in position on the end of the strap and may only be removed by destroying the seal.

The seal may be constructed of a single piece of metal, however the seal may be constructed of two pieces of material, one of the pieces constituting a number plate carrying indicia corresponding to the indicia on the license plate, making it impossible to transfer license plates from one motor vehicle to another motor vehicle, without detection.

It will of course be understood that important matter may be printed or otherwise supplied on the plate, such as the motor number, so that it may be readily determined whether the license belongs on a particular motor vehicle.

The opposite end of the metallic strap 25' passes through a slot in the nut 27, from where it passes through a slot in the flange 9, the free end of the strap being enlarged so that it cannot be moved through the nut 27, should it be attempted to remove the strap without removing the seal 26.

The nut 27 is held in position on the bolt 8 at one side of the license plate.

As clearly shown by Figure 1 of the drawings, the license plate is provided with an outwardly extended lower portion 28 which is ruled with spaced vertical lines 29 and spaced horizontal lines 30 providing spaces for the reception of certain identification indicia.

The spaces or columns formed by these lines are designated by words spelling the months of the year, while certain spaces at one side of the plate are provided with letters and numbers for certain other identification matter.

While I have shown this lower identification section as formed integral with the license plate, it is to be understood that a card such as indicated by Figure 4 of the drawings, and which is constructed of any suitable material, may be bolted to the usual license plate, at the lower edge thereof. It might be further stated that a similar card, that is a card having indicia identical with the indicia of this identification section, is to be carried by the owner or authorized operator of the vehicle, and should the operator of the vehicle be convicted of violating a traffic regulation, the license plate and card will be stamped showing the date on which such violation occurred.

The last row of spaces formed by the vertical lines, will also be provided with a cut out portion formed preferably at the edge of the plate, indicating that the owner of the vehicle equipped with the license plate, has violated a traffic law.

As shown by Figure 5, the card on which the finger prints are arranged, is formed with arrows, and it is contemplated to place the finger prints of the left hand on that side of the card wherein the arrows point downwardly, while the finger prints of the right hand will be placed on that side of the card wherein the arrow heads point upwardly.

When license plates such as shown by this invention are employed, it will be an easy matter for an officer of the law to determine whether or not an operator who has been convicted of violating a traffic regulation, drives carefully after having been warned.

It might be further stated that it is contemplated to issue a card of this character as good for thirty days from date punched on the plate, however should it be desired to issue a card of this character for an entire year, every month would be punched.

Having thus described the invention, what is claimed is:

1. In a device of the character described, a supporting plate having openings near the ends thereof, a record sheet container, apertured extensions formed at the ends of the container and extended through the openings of the supporting plate, a sealing strap extended through the apertured extensions, the ends of the strap being sealed together securing the container in position, a cover housing the container, and means for removably securing the cover in position.

2. In a device of the character described, a supporting plate having openings, a container for containing a record sheet and having transparent walls exposing the record sheet held therein, apertured extensions at the ends of the container extended through the openings of the supporting plate, a sealing strap adapted to extend through the apertures of the extensions, sealing the container on the supporting plate, a cover positioned over the container completely housing the container, and means for removably securing the cover in position.

3. In a device of the character described, a supporting plate having openings, a record sheet container mounted on the supporting plate, apertured extensions extended through the supporting plate, a sealing strap extended through the openings of the extensions securing the container in position on the supporting plate, a cover adapted to house the container, a clamping arm mounted on said plate and having a hook at the upper end thereof and adapted to clamp over the container, a coiled spring mounted on the clamping arm and adapted to urge the clamping arm into engagement with the container cover securing the cover in position.

NICKOLAUS F. MILLER.